United States Patent Office 3,251,659
Patented May 17, 1966

3,251,659
PRODUCING CRYSTALLINE CALCIUM OXIDE
IN AN ELECTRIC ARC FURNACE
Hans Rudolf Mueller, Kasseler Weg 3, and Peter Hack, Kasseler Weg 4, both of Ranzel uber Troisdorf, Germany
No Drawing. Filed Oct. 10, 1962, Ser. No. 229,739
Claims priority, application Germany, Oct. 12, 1961, F 35,119
3 Claims. (Cl. 23—304)

The present invention relates to the production of high quality calcium oxide and more particularly to the production of highly purified, crystalline, anhydrous calcium oxide of large crystal size and of low reactivity, and to such a calcium oxide.

Heretofore, stamping clay or, respectively, shaped bricks or blocks as used in many metallurgical processes and in the production of refractory materials have often been made of magnesium oxide, magnesium oxide-aluminum oxide, or magnesium carbonate-aluminum carbonate. However, more recent investigations have shown that calcium oxide compositions made from caustic lime or sintered lime have many advantages over the above mentioned known compositions. Such calcium oxide compositions not only have superior metallurgical properties but also a considerably improved stability and service life. Molten calcium oxide exhibits these superior properties to an even greater extent. However, heretofore, it was not possible to produce such molten calcium oxide on a large scale because no process is known to manufacture molten calcium oxide of the desired degree of purity.

When melting calcium oxide in an electric arc furnace, it is of utmost importance, to prevent the formation of calcium carbide which is formed even when using graphite electrodes of the highest degree of purity. The presence of even small amounts of calcium carbide renders the molten calcium oxide practically useless. Furthermore, it was not possible, heretofore, to remove the impurities present in the starting material to a satisfactory degree.

It is one object of the present invention to provide a simple and effective process of producing calcium oxide of the desired degree of purity and the properties required for use in stamping masses and compositions, shaped bricks, blocks, and the like materials which process is free of the disadvantages of the known processes.

Another object of the present invention is to provide anhydrous crystalline calcium oxide of large crystal size, a high degree of purity, and low reactivity which is especially suitable for the production of stamping masses or compositions, refractory bricks, blocks, and the like, and for many other purposes.

Other objects of the present invention and advantageous features thereof will become apparent as the description proceeds.

In principle, the process according to the present invention permits simple and large scale production of crystalline calcium oxide of high purity, large crystal size, and low reactivity. Said new process consists in melting technical grade burnt lime and, after all the starting material has been charged and molten, causing the melt to crystalline at a carefully adjusted rate of cooling in only one direction. Preferably crystallization and cooling are effected from the bottom of the container in which the melt is produced toward its top.

In this manner the upper part of the melt remains molten and the impurities as well as the calcium carbide formed during melting collect in said upper molten layer while the resulting crystals of calcium oxide formed in the lower part of the melt are substantially free of such impurities.

Such controlled cooling is advantageously effected by varying current voltage and current intensity. After cooling and crystallization are completed, the entire solidified melt is coarsely crushed and the liquated impurities are separated from the purified calcium oxide crystals.

The following example serves to illustrate the present invention without, however, limiting the same thereto.

EXAMPLE 13,000 kg. of burnt lime are charged into an electric arc furnace of the Higgins type as it is used for electrically melting corundum. The burnt lime has the following composition:

| | Percent |
|---|---|
| $SiO_2$ | 0.38 |
| $Fe_2O_3$ | 0.22 |
| $TiO_2$ | 0.02 |
| $Al_2O_3$ | 0.08 |
| $Na_2O$ | 0.03 |
| $K_2O$ | 0.06 |
| $MgO$ | 0.0 |
| $CaO$ | 99.21 |

Its particle size is between about 10 mm. and about 40 mm. Particles of smaller particle size are to be removed because they cause accumulation of dust in the furnace and thus impede satisfactory operation. The particles should not be larger than 40 mm. because such larger particles might not be completely burnt and, as a result thereof, might cause explosive gas generation and splashing and spattering of the fluid melt.

In order to achieve rapid melting of the burnt lime as soon as possible after starting the furnace, it is necessary to start operation with a high voltage, namely with about 2.5 v. for each cm. distance between the electrodes. Melting itself, however, is carried out with a lower voltage of about 1 v. for each cm. distance between the electrodes. The load was at about 10,000 a. As soon as all the burnt lime has been introduced into and molten in the furnace, the melt was caused to crystallize, crystallization starting from the bottom and the side walls of the furnace, by slowly changing current voltage and current intensity. Such a controlled crystallization which is of utmost importance for the formation of satisfactory calcium oxide crystals and purification of the melt are carried out by increasing step by step the voltage from 1 v. for each cm. distance between the electrodes to about 3 v. and simultaneously decreasing step by step the current intensity in approximately reciprocal relation to the increase in voltage. Such an increase in voltage and decrease in current density is effected within 4 hours to 5 hours.

The following table illustrates controlled cooling and crystallization of a charge of 13,000 kg. according to the present invention.

Table

| Operation time | Voltage | Current intensity | Operation period |
|---|---|---|---|
| 1st to 2nd hour | From 300 v. to 125 v. | From 3,000 a. to 10,000 a. | Starting. |
| 3rd to 27th hour | 125 v. | 10,000 a. | Melting period. |
| 28th hour | 175 v. | 7,000 a. | |
| 29th hour | 225 v. | 5,000 a. | Cooling and crystallization period. |
| 30th hour | 250 v. | 4,000 a. | |
| 31st hour | 275 v. | 3,500 a. | |
| 32nd hour | 300 v. | 3,000 a. | |

Voltage and load are varied as indicated in the table by raising step by step the electrodes. Thereby, the ratio of resistance heating of the melt to electric arc heating is decreased. After cooling the melt in this manner for five hours, the electric current is cut off.

When proceeding in this manner and slowly regulating solidification of the melt, exceptionally pure calcium oxide crystals of considerable size are formed at the bottom and on the side walls of the furnace while the upper layer of the melt is maintained in the liquid state due to the heating effect of the electric arc. As stated above, the impurities present in the starting material as well as the calcium carbide, the formation of which cannot be avoided even when operating very carefully, are collected in said residual melt and are thus segregated from the calcium oxide crystals.

After cooling, the solidified block is crushed by means of a falling weight. The solidified residual melt can readily be sorted out and separated from the large calcium oxide crystals. Likewise, any incompletely molten portions of the melt as they are found at or near the side walls can be sorted out and separated.

The following amounts of constituents of the melt are obtained after crushing the solidified melt:

|  | Kg. |
|---|---|
| (a) Calcium oxide crystals | 8,270 |
| (b) Residual melt (with impurities and calcium carbide), to be discarded | 690 |
| (c) Incompletely molten particles, to be recycled | 3,650 |
| (d) Loss on melting | 390 |
|  | 13,000 |

The calcium oxide crystals sorted out from the crushed melt consist of large, transparent crystals of the appearance of rock salt and, being several cm. long, were of the following composition:

|  | Percent |
|---|---|
| $SiO_2$ | 0.001 |
| $Fe_2O_3$ | 0.006 |
| $TiO_2$ | 0.001 |
| $Al_2O_3$ | 0.01 |
| $Na_2O$ | 0.01 |
| $K_2O$ | 0.01 |
| $MgO$ | 0.02 |
| $CaO$ | 99.942 |

It is evident that the content of impurities in the resulting calcium oxide crystals is very considerably reduced by the simple controlled crystallization process according to the present invention to a small fraction of the initial content of impurities.

The calcium oxide crystals are then comminuted and screened or otherwise classified to the desired grain size. Such high quality calcium oxide has proved to meet all the requirements for use in metallurgical processes and for refractory materials.

Of course, it is understood that controlled crystallization of the molten calcium oxide according to the present invention may be effected by any other means or, respectively, in any other manner than described in the preceding example. The conditions under which cooling and crystallization are effected depend upon the composition of the starting material, its content of impurities, the type of melting furnace used, the current voltage and current intensity employed, and the amount of starting material charged. It can readily be determined by preliminary experiments for each type of starting material and furnace used which cooling and crystallization conditions must be maintained in order to achieve large calcium oxide crystals and to retain at least about 5% of the charge in the molten condition during crystallization so that the impurities and any calcium carbide formed may accumulate in said residual melt, thus separating from the calcium oxide crystals.

The starting burnt lime is preferably a calcium oxide containing at least 99% of calcium oxide. Starting materials with a lower calcium oxide content may also be used, although the yield of pure calcium oxide crystals is then very considerably reduced.

We claim:

1. In a process of producing large crystals of calcium oxide of high purity and low reactivity, the steps which comprise melting by the action of an electric arc impurities-containing calcium oxide, causing the resulting melt to crystallize at a controlled rate of cooling and crystallization by slowly and step by step increasing, within about 4 hours to 5 hours, the voltage from about one volt for each cm. of electrode spacing to about three volt for each cm. of electrode spacing and decreasing the current density at an approximately inverse ratio with respect to the voltage increase, retaining the melt in the molten state at its surface so as to accumulate the impurities in said residual melt, while large crystals of substantially pure calcium oxide separate at the lower part of the melt, turning off the electric current, thereby solidifying the melt, coarsely crushing the mixture of crystals and solidified liquated melt, and separating the crystals of substantially pure calcium oxide from the solidified liquated melt containing the impurities.

2. The process according to claim 1, wherein calcium oxide of about 99% purity of a particle size between about 10 mm. and about 40 mm. is used as starting material.

3. The process according to claim 1, wherein at least about 5% of the molten starting material are maintained in the liquid state during cooling and crystallization.

References Cited by the Examiner

UNITED STATES PATENTS 2,883,721   4/1959   Gorga et al. _____ 13—31
3,154,381   10/1964  Shell et al. _____ 23—301 X

OTHER REFERENCES

Laboratory Chemicals (copyright 1946), Eimer and Amend Co. and Fisber Scientific, page 62, Index #C-116.

Industrial and Engineering Chemistry, vol. 32, #11, pp. 1478–1482, article by Kremers. November 1940.

Mellor: Comprehensive Treatise on Inorganic and Theoretical Chemistry, vol. 3, pp. 660–662.

Semiconductors, by Hannay, pp. 95 to 99, Reinhold Pub. Co., Feb. 27, 1959.

NORMAN YUDKOFF, *Primary Examiner.*

S. J. EMORY, A. J. ADAMCIK, *Assistant Examiners.*